March 27, 1928.
W. A. GRUSE ET AL
1,663,592
PROCESS OF AND APPARATUS FOR RECOVERING PARAFFIN
Filed Oct. 28, 1924  2 Sheets-Sheet 2
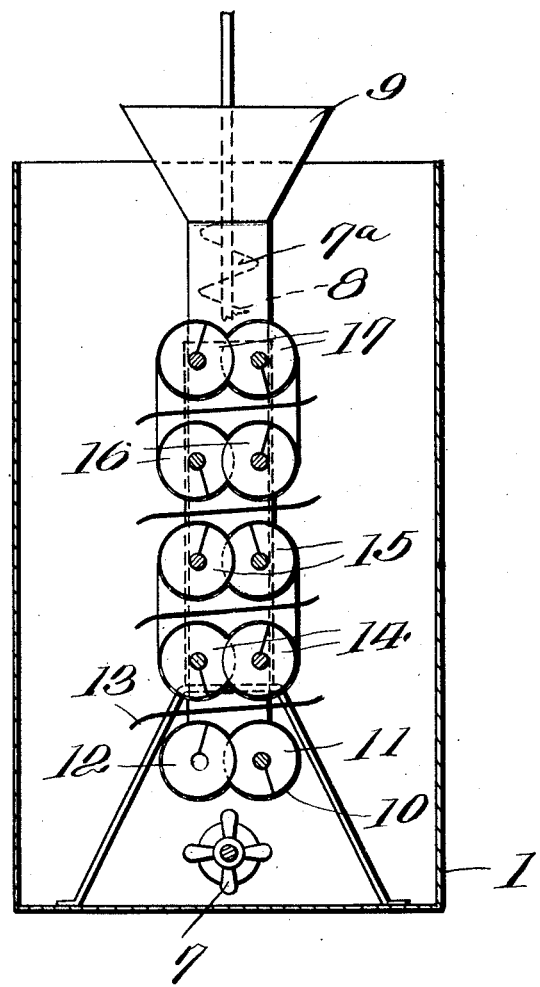

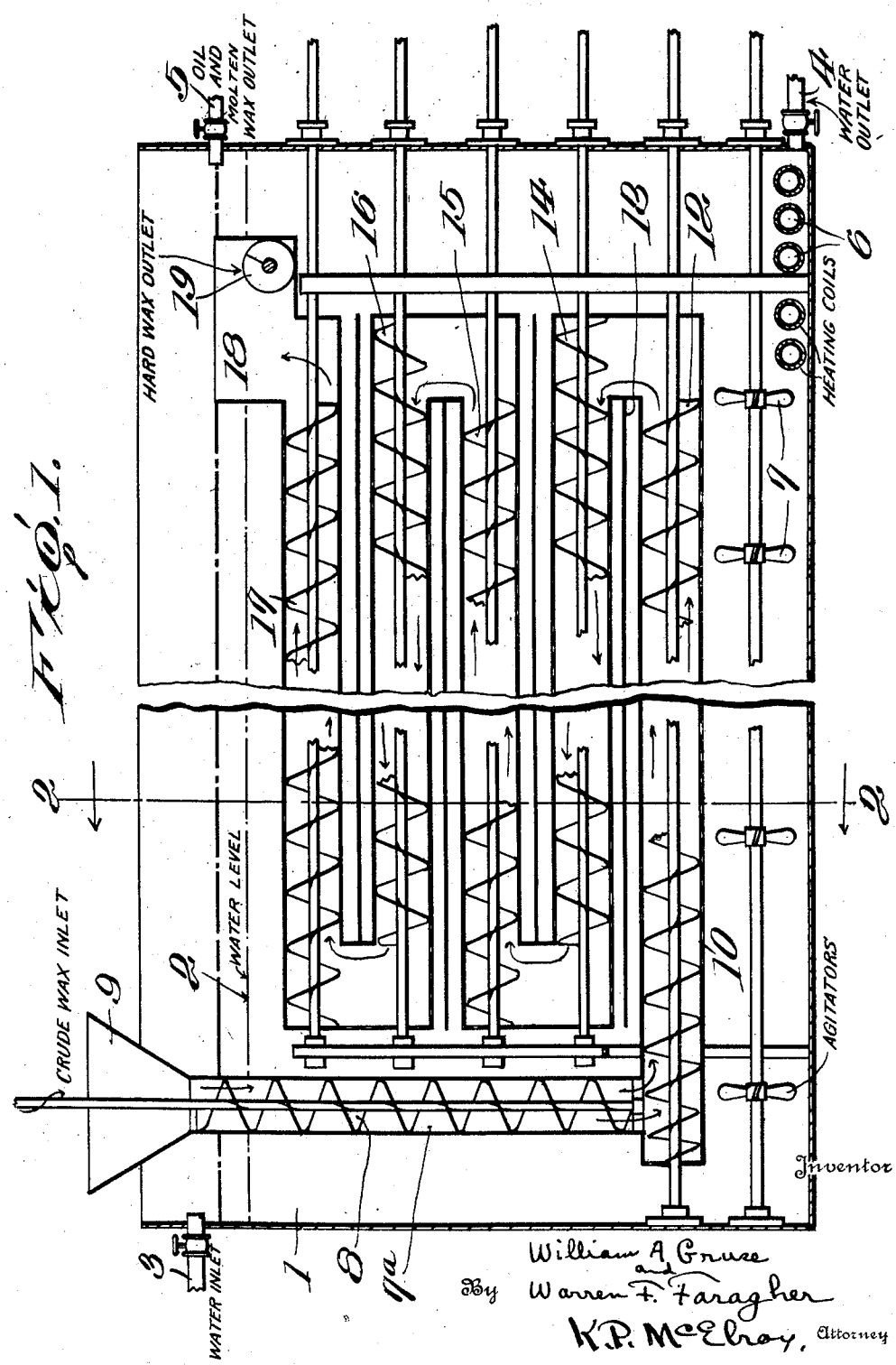

Patented Mar. 27, 1928.

1,663,592

UNITED STATES PATENT OFFICE.

WILLIAM A. GRUSE, OF WILKINSBURG, AND WARREN F. FARAGHER, OF PITTSBURGH, PENNSYLVANIA, ASSIGNORS TO GULF REFINING COMPANY, OF PITTSBURGH, PENNSYLVANIA, A CORPORATION OF TEXAS.

PROCESS OF AND APPARATUS FOR RECOVERING PARAFFIN.

Application filed October 28, 1924. Serial No. 746,374.

This invention relates to processes of and apparatus for recovering paraffin; and it comprises a continuous method of making hard paraffin wherein a solidified mass of paraffin or paraffin oil is conveyed under the surface of a body of water of a fixed temperature, being cut and commingled repeatedly during its progress; and it further comprises as a new assemblage of apparatus elements for the recovery of hard paraffin a water tank, means for keeping water therein of uniform predetermined temperature, intermeshing twin screw conveyor means within said tank, means for delivering paraffin or paraffin oil to one end of screw conveyor means, means for removing relatively hard paraffin from the other end and means for removing floated paraffin oil or relatively soft paraffin from the surface of the water in said tank; all as more fully hereinafter set forth and as claimed.

Paraffin wax as it is recovered from high boiling petroleum distillates is a complex of very many similar waxy hydrocarbons of varying melting points. In practice, it is usual to recover it by chilling an appropriate distillate containing wax to such a temperature that the wax crystallizes out, rendering the total distillate a semi-solid mush. This mush is pumped to filter presses, which separate the solid paraffin wax from the liquid oil, giving a cake of wax. A certain amount of wax of such low melting point that it is normally liquid at ordinary temperatures and a certain amount of liquid oil are retained in the filter cake of wax crystals. The material thus recovered as a filter cake is known as slack wax. This slack wax is melted and cooled slowly to solidify in convenient cakes which are placed on draining racks. These racks are located in pans and the pans in a space whose temperature may be regulated. A slow raising of temperature of the air in the space around the pans will effect, first a separation and draining off of the occluded liquid oil and of the lowest melting wax, then a fractional fusion of the next lowest melting wax, with subsequent draining and separation. By appropriate removal of liquefied material from the pans, and by continuing to raise the temperature various fractions may be obtained. To obtain products of more definite melting point the process may be repeated a number of times. In commercial practice, the operation is unduly time consuming and requires considerable apparatus as well as chamber space in order to make good grades of wax of various melting points.

It is the purpose of the present invention to provide a simpler and quicker and more economical process of making fractions of wax of various melting points. To this end the process is made a continuous one; solidified paraffin or paraffin oil being continuously fed into one end of the apparatus and a wax fraction of desired melting point being continuously removed at the other.

In the present invention the wax which is to be separated or the wax distillate is melted and cooled as usual to a definite temperature, whereby some portion of the wax crystallizes and the material is pressed. This is the usual operation so far but at this point we vary the procedure. The caked material of mixed solid and liquid or slack wax is fed to a pair of intermeshing screw conveyors located in a tank of water of predetermined adjusted temperature and is forced by these conveyors in a tolerably long passage within the body of water. The conveyors cut and separate the mass continuously and the escaping liquid floats to the top of the water while the solids are forced forward by the conveyor to a point of exit. Because of the continual cutting and intermingling which is performed the solid is quite effectively freed of the liquid. Paraffin wax at these temperatures, while it crystallizes, is in a condition in which the crystals will weld together readily and cut surfaces reunite. In the described operation the crystals are cut up and welded together again so to speak and the final product is a solid mass of paraffin effectively freed of all waxes which are liquid at the temperature of the water bath. The operation is very quick and is continuous.

The process may be repeated, the solid wax delivered being put through another water bath of somewhat higher temperature or the delivered oils and low melting waxes being recooled and retreated in another bath of somewhat lower temperature.

The temperature of the water bath is kept so adjusted as to maintain in a liquid condition the waxes which it is desired to remove from the hard paraffin. By raising or lowering the temperature, the paraffin may be freed of such constituents as are liquid at the temperature of the bath.

In the accompanying illustration we have shown, more or less diagrammatically, certain apparatus within the present invention and useful in the performance of the described process. In this showing, Figure 1 is a central longitudinal section of a complete apparatus; and Figure 2 is a transverse section of the same along lines 2—2 of Figure 1.

In this showing element 1 is a water tank of suitable material such as steel or iron. It may be of any size or dimensions but is advantageously relatively large. Within it water stands at a normal level 2. Water can be added through inlet 3 and removed at outlet 4, when there is any necessity for replenishing or cleaning. At the normal water level is valved outlet 5 for removing molten wax and oil. The whole apparatus may be, and advantageously is, lagged or otherwise insulated against loss of heat. The temperature may be kept at any point desired by heating coils 6. Agitating means 7 are provided for keeping the liquid in the tank of uniform temperature. Passing downward through the body of water in the tank is conveyor casing 7ª containing screw conveyor 8. At the top is hopper 9 for receiving paraffin wax. The screw conveyor forces the cake downward and breaks it up, delivering it, as shown by the arrow, to a horizontal conveyor casing 10 of perforated metal. This casing contains, as best seen in Fig. 2, a pair of twin screw conveyors 11 and 12 which intermesh. Above the conveyor casing is a deflector plate 13, (see Fig. 2) serving to conduct oil expelled in the casing to the side. As shown, the twin conveyors force the cake through the warm water to the right. As the cake is cut up by the action of the conveyors expelled oil rises, finds its way through the perforated casing and ultimately gains access to the surface of the water in the bath. The cut-up cake arriving at the right goes upwardly to a similar pair of conveyors 14 also located in a perforated or slotted metal casing. The conveyors 14 cause the cake to travel to the left. At the end of its period of travel it is again taken to the right by similar conveyors 15, again to the left by conveyors 16 and finally by conveyors 17 to a receiving chamber 18, whence it may be removed from the apparatus by any suitable conveyor diagrammatically indicated at 19.

The oil and molten wax separated from the hard paraffin wax by floating on the water pass out through the pipe line 5. The chamber 18 may be provided with a closed top if desired. Ordinarily the layer of molten wax and oil does not rise above the top of chamber 18 because outlet 5 acts to keep the molten wax and oil level just below the top of 18. In order to insure no intermingling of oil with the hard wax collected in chamber 18, the vertical walls of 18 may be substantially increased in height above the plane of outlet 5. Ordinarily, however, if outlet 5 is disposed slightly below the top of chamber 18, as shown, there will be no tendency for molten wax and oil to get into chamber 18.

For clearness of illustration supports for the casing and shafting have been omitted. These elements may be supported and held in any usual way. The shafts driving the various conveyors may be actuated by any source of power (not shown).

The operation of the device illustrated is believed to be obvious from the foregoing description.

What we claim is:—

1. In a continuous method of recovering hard paraffin wax from solidified slack wax, the process which comprises continuously conveying such a solidified wax through a body of water of adjusted temperature and during its progress repeatedly cutting the wax in such a manner as to expose all surfaces to the water and allow oil to separate therefrom and to rise through the water.

2. In a continuous method of recovering hard paraffin wax from solidified slack wax, the process which comprises conveying such a solidified wax beneath the surface of a body of water of adjusted temperature and during its progress continuously cutting, kneading and rewelding the wax while allowing separated liquid to rise through the water, and separately collecting the kneaded wax and the separated molten matter.

3. In a paraffin recovery apparatus, a tank adapted to contain water, means positioned at the normal liquid level of said water to remove oil and molten wax from the surface of said water, a plurality of twin intermeshing screw conveyors within the tank and located below the normal water level, means for introducing paraffin wax at one end of the system of screw conveyors, means for removing purified paraffin wax at the other end, and means for maintaining the water within the tank at a definite temperature.

In testimony whereof we hereunto affix our signatures.

WILLIAM A. GRUSE.
WARREN F. FARAGHER.